Sept. 26, 1967      L. B. LONG      3,344,426
RADAR SYSTEM
Filed Dec. 1, 1965
FIG. 1
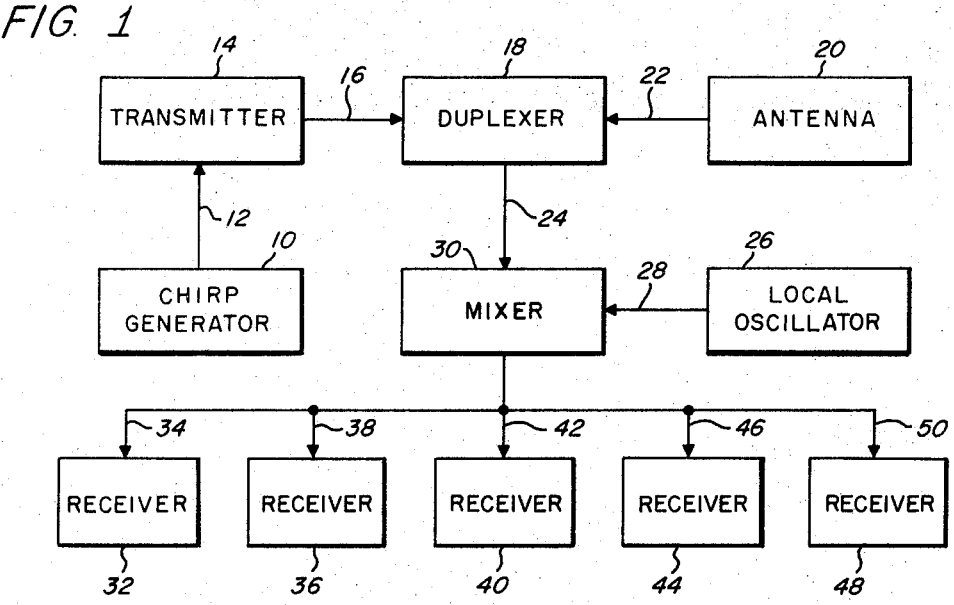
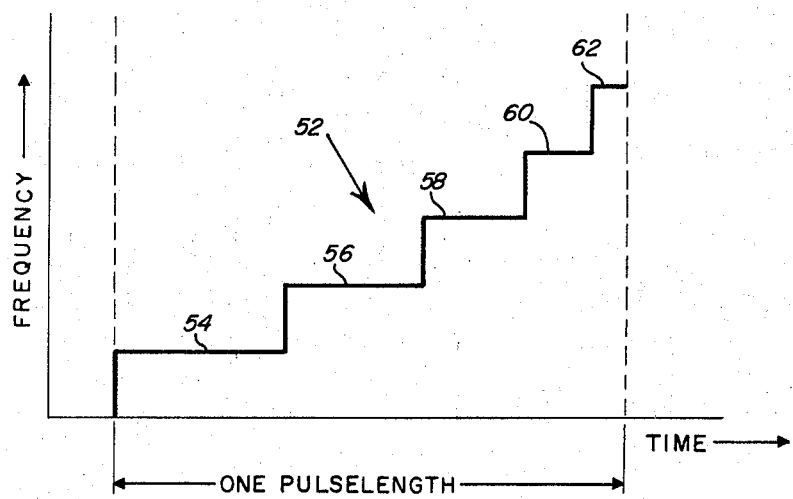
FIG. 2
INVENTOR
LESLIE BRUCE LONG
BY Carole M. Calman
ATTORNEY

United States Patent Office 3,344,426
Patented Sept. 26, 1967

3,344,426
RADAR SYSTEM
Leslie Bruce Long, Lincoln, Mass., assignor to Raytheon Company, Lexington, Mass., a corporation of Delaware
Filed Dec. 1, 1965, Ser. No. 510,862
10 Claims. (Cl. 343—17.2)

ABSTRACT OF THE DISCLOSURE

A frequency scanned, stacked beam radar system which includes a chirp or variable frequency generator for providing a plurality of pulses. Every pulse includes a plurality of sub-pulses, each having both a different frequency and different width. Since the radar range at any elevation angle is a function of the amount of sub-pulse energy at the antenna scan frequency corresponding to that angle, variations of the widths of the sub-pulses within each pulse provides the desired illumination energy at each elevation angle and permits a large number of stacked beams to be illuminated by a single transmitted pulse.

---

This invention is concerned with radar systems and, more particularly, with radar systems which simultaneously sweep a plurality of elevation angles.

A radar system such as a stacked beam radar offers certain advantages over a scanning pencil beam radar when instantaneous comparison of signal returns from different directions is required, or if the radar coverage, data rate, or signal processing techniques require more time on target than is possible with a beam which is scanned in elevation as well as in azimuth. In long range air search applications, it is necessary to cover much lower ranges at higher elevation angles than at lower elevation angles. Hence, care must be taken to avoid wasting transmitter power at the higher elevation angles. In the usual stacked beam system this is partly accomplished by defocusing at these angles, but this is a crude control and its use results in a degradation of the angle data.

A frequency scan radar system is one of the simplest, most economical systems currently available for rapidly scanning a narrow pencil beam over the required elevation angle. Nevertheless, such a radar system does not offer the advantages of the stacked beam system enumerated above. In frequency scan radar systems, the pulse repetition frequency is varied with elevation scan angle in order to improve the number of hits on target since less propagation time can be allowed at the higher angles where less range is required. However, it would be preferable to have more pulses available at low angles where they are needed in order to achieve longer detection ranges. The frequency scanning radar, nevertheless, does have the advantage of requiring only a single transmission line connection to the antenna.

Accordingly, a primary object of the present invention is to provide an improved radar system for simultaneously sweeping a plurality of elevation angles and, more specifically, one including improved means for changing the range covered at different elevation angles.

A further object of the invention is to provide an improved radar system having a high data rate.

Another object of the invention is to provide an improved radar system which efficiently utilizes all available energy in order to achieve the desired coverage.

These and other related objects are accomplished in a preferred embodiment of the invention by a frequency scanned, stacked beam radar system which includes a chirp or variable frequency generator for providing a plurality of pulses. Every pulse includes a plurality of sub-pulses, each having both a different frequency and different width. Since the radar range at any elevation angle is a function of the amount of sub-pulse energy at the antenna scan frequency corresponding to that angle, variations of the widths of the sub-pulses within each pulse provides the desired illumination energy at each elevation angle and permits a large number of stacked beams to be illuminated by a single transmitted pulse.

Other objects, features, and embodiments of the invention will be apparent from the following description and reference to the accompanying drawings, wherein:

FIG. 1 is a block diagram of the preferred embodiment of the invention; and,

FIG. 2 is a diagrammatic representation of the chirp generator output waveform.

A preferred embodiment of the invention is shown in FIG. 1 and comprises transmitter 14 connected between chirp generator 10 and duplexer 18, antenna 20 also connected to duplexer 18, and mixer 30 connected to local oscillator 26, duplexer 18, and receivers 32, 36, 40, 44, and 48. The output waveform of chirp generator 10 is depicted in FIG. 2 and includes a single pulse 52 having five sub-pulses 54, 56, 58, 60, and 62, each of which has a different frequency and different length. Chirp generator 10 may comprise, for example, an oscillator having a variable capacitor in its tank circuit and a control device connected to the oscillator (not shown). The control device selectively changes the variable capacitor at the beginning of each sub-pulse 54, 56, 58, 60, and 62 in order to cause the oscillator to generate the desired sub-pulse frequency for a preselected duration of time. Transmitter 14 may comprise a well-known Klystron or travelling wave tube amplifier for providing an RF pulse to antenna 20. Duplexer 18 may include a well-known antitransmit-receive switch for channeling received echoes to line 24 and a transmit-receive switch for disconnecting receivers 32, 36, 40, 44, and 48 during transmission. Antenna 20 may comprise any of the currently available frequency scanned antennas such as a serpentine-fed array antenna in which steering in elevation is accomplished by known frequency scan techniques. Mixer 30 and local oscillator 26, which may include a reflex Klystron or an appropriate output from generator 10, are well-known elements for converting radio-frequency signals into intermediate-frequency signals in order to enable the received signals to be more easily processed. Similarly, receivers 32, 36, 40, 44 and 48 are well-known devices and each includes a filter or filters tuned to the different frequencies corresponding to the elevation angles illuminated by the stairs of pulse 52.

In order to prevent undue burdening of the description with matter within the ken of those skilled in this art, a block diagram approach is followed herein, with a detailed functional description of each block and specific identification of the devices it represents. Thus, the individual is free to consult any of the presently-available treatises for a more detailed description of these well-known blocks, such as "Introduction to Radar Systems," by Merrill I. Skolnik, published by McGraw-Hill Book Company, Inc., in 1962, and which is incorporated herein by reference.

As was stated previously, it is often desirable in air search applications to shape the illumination pattern of antenna 20 in order to conserve energy so that more range is covered at the lower elevation angles. This can be done because of the inability of aircraft to fly the same distance in height as they can travel parallel to ground.

Radar range at any elevation angle is a function of the amount of sub-pulse energy at the antenna scan frequency corresponding to that angle. Chirp generator 10 provides a plurality of staircase pulses 52, each including five sub-pulse 56 at a lower frequency than sub-pulse 58; sub-pulse 54 as being at a lower frequency than sub-pulse 56; sub-pulse 56 at a lower frequency than sub-pulse 58; sub-pulse 58 at a lower frequency than sub-pulse 60; and, sub-pulse 60 at a lower frequency than sub-pulse 62. In addition, sub-pulse 54 has a longer width than sub-pulse 56; sub-pulse 56 has a longer width than sub-pulse 58; sub-pulse 58 has a longer width than sub-pulse 60; and, sub-pulse 60 has a longer width than sub-pulse 62. Consequently, the sub-pulse steps of pulse 52 increase in frequency and decrease in length. Thus, as frequency and hence elevation angle increases, the amount of sub-pulse energy and thus range decreases. In this manner, progressively less range is covered as elevation angle increases.

Chirp generator 10 applies pulse 52 to transmitter 14 via line 12. In response to pulse 52, transmitter 14 transfers a staircase radio-frequency pulse over line 16 to duplexer 18. The transmit-receive switch (not shown) in duplexer 18 prevents line 24 from conducting any part of this radio-frequency pulse, which is then applied to antenna 20 via line 22. Antenna 20 comprises a frequency scanned stacked beam antenna for radiating into space five overlapping beams. Each beam is positioned at a different elevation angle and has a different length. As elevation angle increases, the length of the beams decreases. Consequently, the illumination pattern generated by antenna 20 is shaped such that the range coverage at lower elevation angles is consecutively greater than at higher elevation angles.

As the illumination pattern intercepts a target, an echo is received by antenna 20 and transferred to duplexer 18 via line 22. Duplexer 18 then applies the echo to mixer 30 where it is mixed with a signal from local oscillator 26 in order to convert the radio-frequency echo to an intermediate-frequency signal. The intermediate-frequency signal is next applied to inputs 34, 38, 42, 46, and 50 of receivers 32, 36, 40, 44, and 48, respectively. Each receiver 32, 36, 40, 44, and 48 includes a matched filter (not shown) which is tuned to a frequency corresponding to one of the elevation angles of the illumination pattern and whose bandwidth is matched to the width of one sub-pulse. Hence, receiver 32 admits echoes from the smallest elevation angle covered; receiver 36 accepts echoes from the next higher elevation angle; receiver 40 admits echoes from the following elevation angle; receiver 44 accepts echoes from the next higher elevation angle; and, receiver 48 admits echoes from the largest elevation angle covered. Accordingly, receivers 32, 36, 40, 44, and 48 can simultaneously receive echoes from different elevation angles.

Accordingly, the invention includes a frequency scanned, radar system requiring only one transmission line for connecting transmitter 14 and receivers 32, 36, 40, 44, and 48 to antenna 20 and comprises means for achieving a desired shaped radar coverage at a high data rate by providing variable width sub-pulses within each transmitted pulse. Since the radar range at any elevation angle is a function of the amount of sub-pulse energy at the antenna scan frequency corresponding to that angle, chirp generator 10 provides a staircase frequency chirp within each pulse wherein the stairs have variable widths. This causes antenna 20 to generate the desired illumination energy at each elevation angle and permits a large number of stacked beams to be illuminated by a single transmitted pulse. For air search applications, the steps are selectively varied in width so that larger ranges are covered at lower elevation angles than at higher ones. Separate receiver matched filters (not shown) are tuned to receive the various frequencies used for illumination and have bandwidths that are matched to the respective sub-pulse widths.

By controlling the radar coverage pattern in the foregoing manner, greater flexibility in radar design is possible because all of the desired beams can be illuminated within each pulse. A constant pulse repetition frequency may be used, which greatly simplifies the transmitter and signal processor and makes the invention extremely suitable for moving target applications. Moreover, the sub-pulses could be ramps instead of steps. Consequently, it should be appreciated that the invention is not limited to the preferred embodiment disclosed herein but embraces the full scope of the following claims.

What is claimed is:

1. A frequency scanned pulse transmitting system for illuminating an area so as to concentrate the energy therefrom at desired angles in varying amounts, comprising:
    generator means for providing a pulse including a plurality of sub-pulses, each having a different frequency and at least some having a different width; and,
    propagation means coupled to said generator means for propagating an illumination beam pattern including a plurality of beams, each beam illuminating a different angle and at least some beams having different lengths.

2. The invention according to claim 1 and wherein:
    said generator provides a staircase pulse including a plurality of sub-pulses, each being a step of said staircase and having a different frequency and different width than the others.

3. The invention according to claim 1 and wherein:
    said generator provides a staircase pulse including a plurality of sub-pulses, each being a step of said staircase and progressively increasing in frequency.

4. The invention according to claim 1 and wherein:
    said generator provides a staircase pulse including a plurality of sub-pulses, each being a step of said staircase and progressively increasing in frequency and decreasing in width.

5. The invention according to claim 1 and wherein:
    said pulse transmitting system comprises a radar system for illuminating an area so as to simultaneously cover a plurality of elevation angles at different ranges; and,
    said propagation means includes a transmitter and an antenna coupled to said transmitter.

6. The invention according to claim 1 and wherein:
    said pulse transmitting system comprises a radar system for illuminating an area so as to simultaneously cover a plurality of elevation angles at different ranges;
    said propagation means includes a transmitter and an antenna coupled to said transmitter for propagating pulses and receiving echoes; and,
    a plurality of receivers each coupled to said antenna and being tuned to receive echoes from a different elevation angle.

7. The invention according to claim 1 and wherein:
    said pulse transmitting system comprises a radar system for illuminating an area so as to simultaneously cover a plurality of elevation angles at different ranges;
    said propagation means includes a transmitter and an antenna for propagating pulses and receiving echoes;
    a plurality of receivers each being tuned to receive echoes from a different elevation angle; and,
    duplexing means coupled to said transmitter, said antenna, and said receivers for selectively passing signals.

8. The invention according to claim 1 and wherein:
    said pulse transmitting system comprises a radar system for illuminating an area so as to simultaneously cover a plurality of elevation angles at different ranges;
    said generator provides a staircase pulse including a plurality of sub-pulses, each being a step of said staircase and having a different frequency and different width than the others;
    said propagation means includes a transmitter and an antenna coupled to said transmitter for propagating pulses and receiving echoes; and, a plurality of receivers each coupled to said antenna and being tuned to receive echoes from a different elevation angle.

9. The invention according to claim 1 and wherein:

said pulse transmitting system comprises a radar system for illuminating an area so as to simultaneously cover a plurality of elevation angles at different ranges;

said generator provides a staircase pulse including a plurality of sub-pulses, each being a step of said staircase and consecutively increasing in frequency and decreasing in width;

said propagation means includes a transmitter and an antenna coupled to said transmitter for propagating pulses and receiving echoes; and, a plurality of receivers each coupled to said antenna and being tuned to receive echoes from a different elevation angle.

10. The invention according to claim 1 and wherein:

said pulse transmitting system comprises a stacked beam radar system for illuminating an area so as to simultaneously cover a plurality of elevation angles at different ranges;

said generator includes a variable frequency oscillator and provides a staircase pulse including a plurality of sub-pulses, each being a step of said staircase and progressively increasing in frequency and decreasing in width;

said propagation means includes a transmitter and a stacked beam antenna coupled to said transmitter for propagating pulses and receiving echoes; and, a plurality of receivers each coupled to said stacked beam antenna and including filter means being tuned to receive echoes from a different elevation angle.

References Cited

UNITED STATES PATENTS

| | | | |
|---|---|---|---|
| 3,017,630 | 1/1962 | Begovich et al. | 343—11 X |
| 3,029,429 | 4/1962 | Rodgers | 343—11 X |
| 3,064,252 | 11/1962 | Varela | 343—16 |
| 3,263,227 | 7/1966 | Ferry et al. | 343—17.2 |

OTHER REFERENCES

J. R. Klauder et al.: The Theory and Design of Chirp Radars, Bell System Technical Journal, vol. 39, No. 4, July 1960, pp. 745–753.

RODNEY D. BENNETT, *Primary Examiner.*

CHESTER L. JUSTUS, *Examiner.*

J. P. MORRIS, *Assistant Examiner.*

UNITED STATES PATENT OFFICE
CERTIFICATE OF CORRECTION

Patent No. 3,344,426 September 26, 1967

Leslie Bruce Long

It is hereby certified that error appears in the above numbered patent requiring correction and that the said Letters Patent should read as corrected below.

Column 3, lines 4 and 5, for "sub-pulse 56 at a lower frequency that sub-pulse 58;" read -- sub-pulses 54, 56, 58, 60, and 62. Fig. 2 depicts --.

Signed and sealed this 1st day of October 1968.

(SEAL)
Attest:

Edward M. Fletcher, Jr.
Attesting Officer

EDWARD J. BRENNER
Commissioner of Patents